June 22, 1954     J. J. BLACK     2,681,716
SNAP-ON MOLDING
Filed Dec. 31, 1948
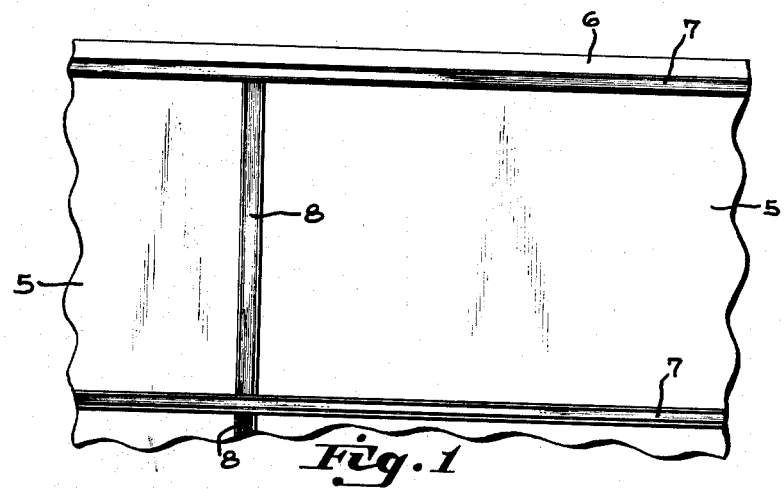
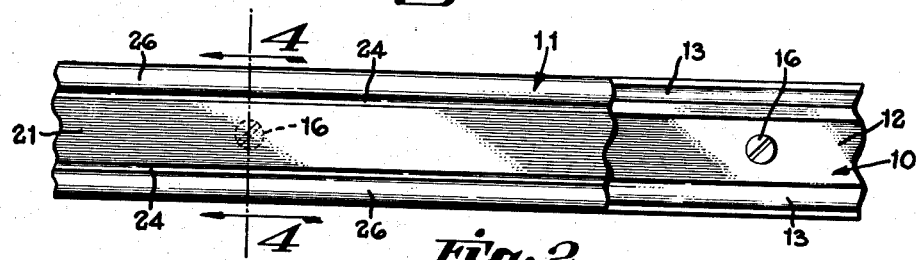
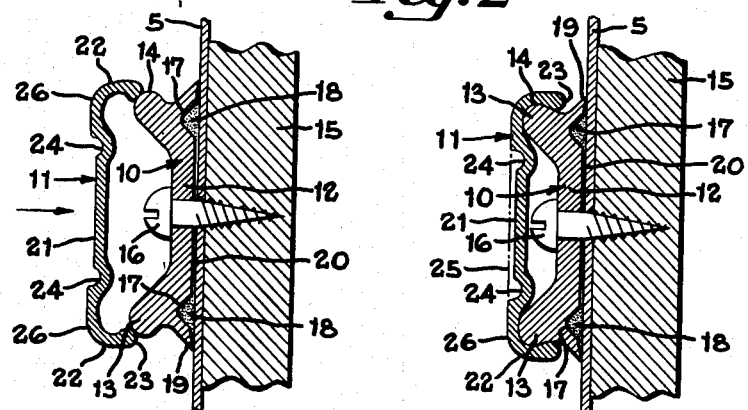
INVENTOR.
James J. Black
BY
Wood, Arey, Herron & Evans
ATTORNEYS.

Patented June 22, 1954

2,681,716

UNITED STATES PATENT OFFICE 2,681,716

SNAP-ON MOLDING

James J. Black, Cincinnati, Ohio, assignor, by mesne assignments, to Trailmobile Inc., a corporation of Delaware Application December 31, 1948, Serial No. 68,571

3 Claims. (Cl. 189—88)

This invention relates to molding strips which are used in panel structures to cover and seal the joints between adjacent panels and to enhance the appearance of the panelled wall. The invention resides in a two-piece molding of the snap-on type, designed to mount panels upon a base or framework with the molding strips overlying the marginal edges of adjacent panels to clamp the panels to the base, outlining the panels and leaving the exposed panel area free of attaching devices.

The improved molding embodies a base strip which is placed over the panel seams and attached by screws to the frame structure, and a cap or trim strip which is snapped over the base strip after installation to conceal the screws and present a decorative appearance. The molding strip may be applied to a variety of structures but has been designed primarily for securing the sheet metal panels to the framework of trailer bodies at the outside of the body, to present a trim, waterproof side wall.

In the normal operation of trailers, the vehicle must be maneuvered into and out of loading areas such as warehouses so that frequently the body side wall is scraped against doorways and other obstructions. The snap-on moldings employed in the past frequently were damaged by such impacts, causing the cap or trim strip to become loosened and sometimes torn completely away, thus spoiling the appearance of the vehicle. The trim strip of these moldings conventionally has been somewhat oval shaped, and the center area, being higher than the edges, was exposed to impacts, causing deformation such that the molding would relax its engagement with the base strip.

A primary object of the invention has been to provide an improved molding strip of the snap-on variety so arranged that the outside trim strip is able to withstand impacts without being deformed or loosened, and further to provide a base strip arranged to seat snugly upon the surface of the panels to shed water and establish a seal. The improved structure constitutes base and trim strips of rugged design, formed preferably from non-corrosive extrusions such as aluminum, the base strip including an outer face of dove tail formation, the trim strip being expansible so that it may conveniently be pressed home upon the dove tail portion to establish a self-locking fit upon the base strip. In order to prevent damage due to impacts and blows, the trim strip is substantially flat with its center portion depressed below the plane of its outer edges, the outer edges being supported by the dove tail portion of the base strip. Thus, upon encountering an obstruction, the impact is absorbed by the solidly supported edges of the trim strip which are thus able to absorb the impact without deformation, thereby preventing it from being torn loose from the base strip.

For the purpose of making a water-tight joint, the inner face of the base strip is configurated to provide marginal feathered edges adapted to establish a line contact with the panels so that the pressure developed by the fastening screws is concentrated along the feathered edges to establish an exceptionally snug fit upon the panel surface. The configuration of the feathered edges also provides a groove which may be filled with plastic cement to establish a waterproof seal between the base strip and panels, and the feathered edges space the strip slightly from the panels so that the cement is not squeezed out when the fastening screws are tightened.

Other details and advantages of the invention will be more fully disclosed in the specification with reference to the drawings in which:

Figure 1 is a general fragmentary side elevation illustrating a panel such as the side wall of a trailer body, with the improved molding installed thereon.

Figure 2 is an enlarged face view of the improved molding.

Figure 3 is an enlarged sectional view showing the base strip and its association with the panels and framework, with the cap strip in position to be snapped in place.

Figure 4 is a sectional view taken on line 4—4, Figure 2, showing the molding after the application of the cap strip.

As shown in Figure 1, the improved molding strips are illustrated as applied to the outside wall of a trailer body although they may be applied to other panel structures to secure and seal the joint between abutting panels. The trailer body constitutes generally a frame which is covered by sheet metal panels, for example formed from aluminum sheets. That portion of the trailer body disclosed in Figure 1 includes sheet metal panels 5 and a roof section 6, the horizontal seams between the roof section and the panels and between adjoining panels being concealed by the horizontal and vertical molding strips indicated at 7 and 8.

As detailed in Figures 3 and 4, the molding assembly constitutes a base strip 10 and a trim strip 11 adapted to mate with the base strip, both being formed preferably of aluminum extrusions. Base strip 10 generally is channel shaped, having a depressed central portion 12 and a pair of flanges or beads 13—13 along opposite edges, extending angularly to provide a dove tail formation for a snap engagement by the cap strip 11. The beads are rounded as at 14 to provide wedging surfaces to expand and grip the cap or trim strip when it is pressed upon the base strip, as shown in Figure 3.

In assembly, the marginal edges of panels 5 abut each other along the framing member 15 and are clamped to the member 15 by the base strip 10 which is placed upon the outer surface of the panels and secured by screws 16 spaced at intervals in the depressed portion 12, which provides clearance for the screw heads. The framing members may be of wood, metal or other material, the base strip being attached either by machine screws or wood screws as required. In order to establish a water tight seal, the inner face of the base strip 10 is channeled as at 17—17 along its opposite edges and cement 18 may be applied between the panels and base strip as indicated. In addition, the opposite edges of the base strip are feathered as at 19 to establish a line contact with the panels to form a tight joint slightly above the trim strip to shed water. It will be observed that the screws 16 draw the base strip down upon the panels and the clamping pressure is concentrated upon the feathered edges, firmly clamping the panels to the framing members, and also that the feathered edges space the strip slightly from the panel surface as indicated at 20 to retain a cement coating between the strip and panels.

After the base strip is installed, the cap strip 11 is applied by forcing it over the beads 13—13, the trim strip consisting of a body section 21 having flanges 22—22 along opposite edges adapted to mate with the beads 13—13 of the base strip 10. The edges of the flanges 22 are rounded as at 23 to adapt the flanges to slide over the rounded edges 14 of the beads 13—13. The cap 11 is applied by placing it upon the base strip and applying pressure, the flanges 22 being expanded outwardly by the wedging action of the rounded portion 14 of the beads such that the cap 11 snaps over the beads. After passing over the widest portion of the beads the flanges 22 contract and establish a mating engagement with the beads to lock permanently the two parts together as shown in Figure 4.

The central section 21 of the cap is delineated by a pair of longitudinal grooves or corrugations 24—24 which increase the yieldability of the strip, and as indicated by the broken line 25 in Figure 4, the central section 21 is spaced inwardly from the plane of the marginal portions 26 between the grooves. The opposite edges 26 of the cap thus are solidly supported by the beads 13—13 to protect the center portion from being bent or otherwise damaged by impacts and blows which normally occur in the course of the trailer operation.

The improved molding is of rugged construction and provides a secure water-tight anchorage for the panels and sheds water readily by reason of the feathered edges of the base strip. The trim strip is relatively stiff but by virtue of the expansive wedging action developed by the rounded beads, it is pressed in place without excessive pressure and clinches securely upon the base strip.

Having described my invention, I claim:

1. A two-piece molding strip assembly for securing the marginal edges of adjacent panels to a support structure comprising, a metal base strip engaged upon the surface of the panels and anchored to the support structure, a metal trim strip forcibly sprung into clamping engagement upon the face of the base strip, said trim strip being generally channel shaped in cross section providing metal sections of substantial thickness and rigidity, the trim strip having a pair of flanges of limited yieldability along opposite sides thereof projecting toward the panels, the base strip being generally channel shaped in cross section providing a pair of rigid flanges along opposite side edges thereof, the rigid flanges having external surfaces which diverge outwardly from one another at acute angles to the plane of the panels, the outer end portions of the rigid flanges having partially cylindrical opposed wedging surfaces curving outwardly and downwardly to the said external diverging surfaces, the yieldable flanges having partially cylindrical internal surfaces complemental to the partially cylindrical wedging surfaces of the rigid flanges, the normal internal spacing of the outer ends of the yieldable flanges being less than the greatest external distance across said opposed curving wedging surfaces, the yieldable flanges being expanded outwardly upon being forcibly sprung over the opposed wedging surfaces and contracting into intimate nesting engagement with said curved wedging surfaces, whereby the rigid flanges provide a solid metal support for the trim strip.

2. A two-piece molding strip assembly for securing the marginal edges of adjacent panels to a support structure comprising, a metal base strip engaged upon the surface of the panels and anchored to the support structure, a metal trim strip forcibly sprung into clamping engagement upon the face of the base strip, said trim strip being generally channel shaped in cross section providing metal sections of substantial thickness and rigidity, the trim strip having a pair of flanges of limited yieldability along opposite sides thereof projecting toward the panels, the base strip being generally channel shaped in cross section and having metal sections of substantially greater thickness than the trim strip sections, the base strip having a pair of rigid flanges along opposite side edges thereof, the rigid flanges having external surfaces which diverge outwardly from one another at acute angles to the plane of the panels, the outer end portions of the rigid flanges having partially cylindrical opposed wedging surfaces curving outwardly and downwardly to the said external diverging surfaces, the yieldable flanges having partially cylindrical internal surfaces complemental to the partially cylindrical wedging surfaces of the rigid flanges, the normal internal spacing of the outer ends of the yieldable flanges being less than the greatest external distance across said opposed curving wedging surfaces, the yieldable flanges being expanded outwardly upon being forcibly sprung over the opposed wedging surfaces and contracting into intimate nesting engagement with said curved wedging surfaces, the yieldable trim strip flanges having a width less than the distance from the panel surface to the outer ends of the rigid flanges, thereby to space the ends of the yieldable flanges from the panel surface with the rigid flanges providing a solid metal support for the trim strip.

3. A two-piece molding strip assembly for securing the marginal edges of adjacent panels to a support structure comprising a metal base strip engaged upon the surface of the panels and anchored to the support structure, a metal trim strip forcibly sprung into clamping engagement upon the face of the base strip, said trim strip being generally channel shaped in cross section providing metal sections of substantial thickness and rigidity, the trim strip having a flat outer face and having a pair of flanges of limited yieldability along opposite sides thereof, the flat outer face of the trim strip including a pair of parallel corrugations formed along opposite sides of the flat outer face adjacent said flexible flanges, said corrugations providing resilient bending lines imparting yieldability to said flanges, the base strip being generally channel shaped in cross section and having a metal section of substantially greater thickness than the base strip, the base strip having a pair of rigid flanges along opposite side edges thereof, the rigid flanges having external surfaces which diverge outwardly from one another at acute angles to the plane of the panels, the outer end portions of the rigid flanges having partially cylindrical opposed wedging surfaces curving outwardly and downwardly to the said external diverging surfaces, the yieldable flanges having partially cylindrical internal surfaces complemental to the partially cylindrical wedging surfaces of the rigid flanges, the normal spacing of the outer ends of the yieldable flanges being less than the greatest external distance across said opposed curving wedging surfaces, the yieldable flanges being expanded outwardly upon being forcibly sprung over the opposed wedging surfaces and contracting into intimate nesting engagement with said curved wedging surfaces, the yieldable trim strip flanges having a width less than the distance from the panel surface to the outer ends of the rigid flanges, thereby to space the ends of the yieldable flanges from the panel surface with the rigid flanges providing a solid metal support for the trim strip.

References Cited in the file of this patent

UNITED STATES PATENTS

| Number | Name | Date |
| --- | --- | --- |
| 815,946 | Ettenger | Mar. 27, 1906 |
| 1,476,509 | Hart | Dec. 4, 1923 |
| 2,140,234 | Lamer | Dec. 13, 1938 |
| 2,297,887 | Hall et al. | Oct. 6, 1942 |
| 2,353,583 | Place | July 11, 1944 |

FOREIGN PATENTS

| Number | Country | Date |
| --- | --- | --- |
| 202,814 | Switzerland | May 1, 1939 |